United States Patent [19]
Cline

[11] 3,965,732
[45] June 29, 1976

[54] COMPUTER TYPE BRAKE ANALYZER
[75] Inventor: Edwin Lee Cline, Pasadena, Calif.
[73] Assignee: Clayton Manufacturing Company, El Monte, Calif.
[22] Filed: May 5, 1975
[21] Appl. No.: 574,284

Related U.S. Application Data
[63] Continuation-in-part of Ser. No. 382,538, July 25, 1973, Pat. No. 3,899,916, which is a continuation-in-part of Ser. No. 811,168, March 27, 1969, abandoned.

[52] U.S. Cl. .................................. 73/126; 73/132
[51] Int. Cl.² .................................. G01L 5/28
[58] Field of Search ............. 73/132, 123, 126, 117, 73/121

[56] References Cited
UNITED STATES PATENTS

| | | | |
|---|---|---|---|
| 1,987,706 | 1/1935 | Prentiss | 73/126 |
| 3,465,577 | 9/1969 | Donovan | 73/117 UX |
| 3,602,042 | 8/1971 | Mitchell | 73/132 X |

Primary Examiner—Jerry W. Myracle
Attorney, Agent, or Firm—Jackson & Jones Law Corporation

[57] ABSTRACT

An apparatus for analyzing the performance of wheeled, land vehicle brake systems is described wherein means are provided for driving the vehicle wheels at a predetermined speed and the operator or computer controlled brake actuator selectively applies the brakes in a series of simple successive steps comprising the test sequence. The pedal force, or other actuating force, the brake effort exerted by each wheel, and the imbalance between the braking effort of opposite wheels is measured and recorded on a strip chart or fed to a computer, to determine if the measured values fall outside of a predetermined range of values representing acceptable deviations from standard values. Any deviation of the brake effort from the acceptable values, or excessive imbalance between opposite wheels at any point in the test sequence, may be used as a basis for diagnosing and identifying a specific brake malfunction. The system can be enlarged to simultaneously test the brakes on all wheels of a land vehicle.

23 Claims, 11 Drawing Figures

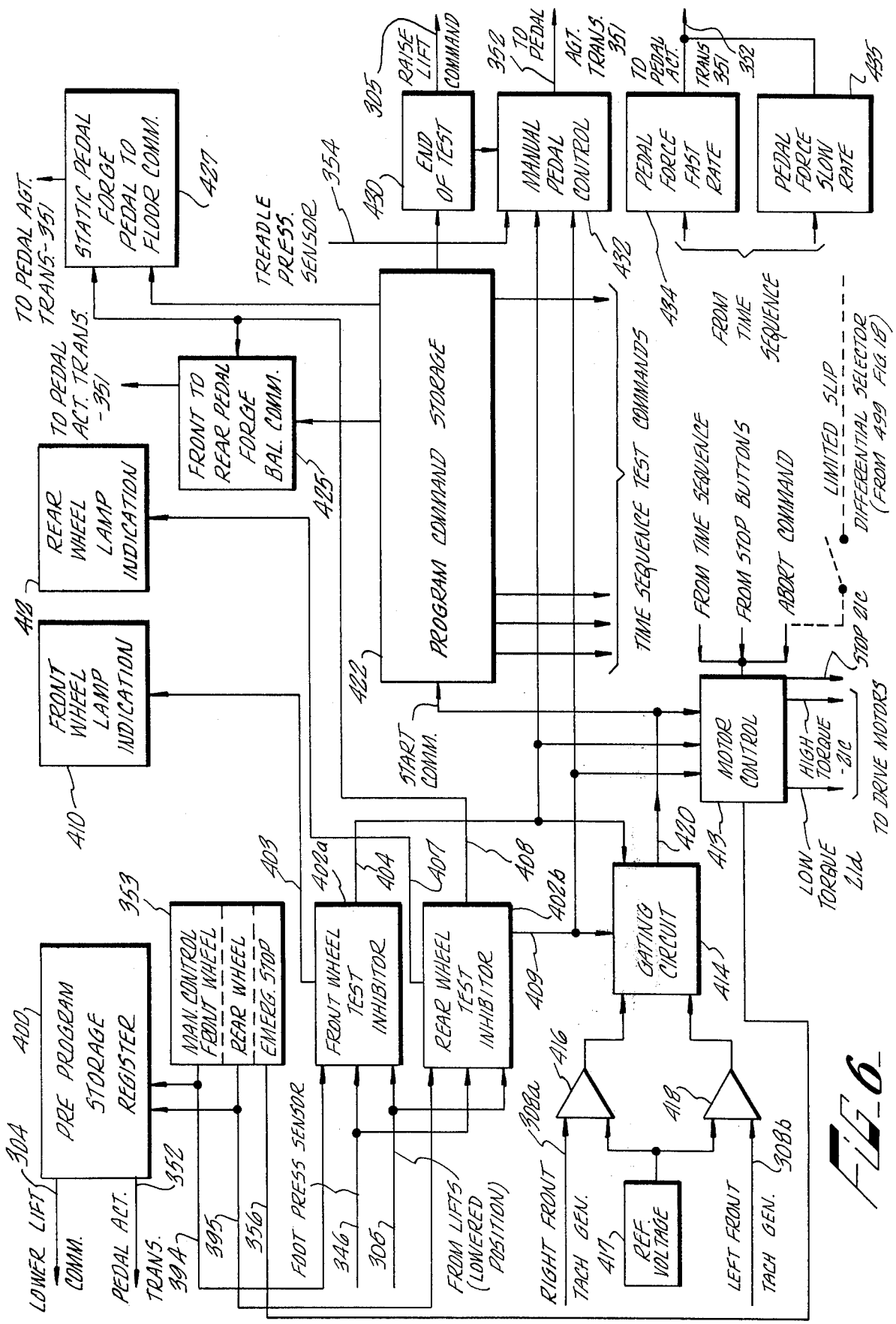

COMPUTER TYPE BRAKE ANALYZER

BACKGROUND OF THE INVENTION

Reference to Copending Application

This is a continuation in part application of copending application Ser. No. 382,538, filed July 25, 1973 now U.S. Pat. 3,899,916 which is a continuation in part of application Ser. No. 811,168 filed Mar. 27, 1969, now abandoned.

Field of the Invention

The present invention relates to improved apparatus and systems for testing and diagnosing faults in wheeled, land vehicle brake systems. The invention particularly relates to a computer controlled or automatic brake analyzer system to provide a rapid and reliable analysis of vehicle brakes for purposes of safety and to facilitate repair of defective components.

The present invention is of great importance and practical value because faulty or inadequate vehicle brakes are one of the significant contributing causes to the ever increasing number of automobile accidents. It is well known that brake malfunctions caused by neglect, rather than poor brake design, are responsible for essentially all instances of faulty or inadequate vehicle brakes. Furthermore, in a majority of instances, the neglect of vehicle brakes is not intentional. Rather, the owner simply is not aware of the existence of potentially hazardous conditions.

It is frightening to discover that faulty vehicle brakes frequently respond normally under average driving conditions. Consequently, the driver is lulled into a sense of false security concerning the adequacy of his brakes, and, therefore does not have them inspected, and is completely surprised when a malfunction occurs during emergency deceleration or sudden stops. It is perhaps more unfortunate that a significant number of potentially hazardous, but easily repairable, brake malfunctions are not discovered during routine inspection solely because prior existing inspection methods and equipment do not expose them.

SUMMARY OF THE INVENTION

The present invention relates to a brake testing apparatus of high integrity, which will detect nearly all types of brake malfunction, identify which brake is subject to the malfunction, and further indicate whether the factor causing the malfunction is mechanical, hydraulic or frictional. In many cases an even more specific cause of the detected malfunction can be readily determined and an accurate repair ticket immediately prepared. Furthermore, the present invention relieves the test operator of the task of reading output instruments or manually recording indicated values during the test procedure and thereby reduces test time while greatly increasing accuracy and reliability.

The brake analyzing apparatus of the present invention includes means for selectively driving the wheels of the test vehicle. Thus, each wheel of the vehicle is cradled between a separate pair or rolls rotatably supported by bearings mounted on a frame assembly. A cradle-mounted electric motor is provided as a prime mover for each set of rolls and arranged to drive only the rear rolls of the set through a flexible coupling. Other forms of prime mover can be used, such as a hydraulic or pneumatic motor, or an internal combustion engine. All of these are particularly suitable for portable brake testing apparatus. The rolls are driven at equal controlled speeds up to 45 MPH or more and in the preferred form of apparatus, the brake effort is proportional to the reaction force upon each motor housing and is individually measured for each wheel by a pneumatic weighing unit, or force transducer.

In performing a test, the operator or a computer controlled brake actuator applies predetermined forces to the brake pedal, or other brake actuating means, of the test vehicle in a predetermined testing sequence. When the vehicle brakes are actuated, the braking effort produced at each wheel is proportional to the reaction force upon the corresponding motor housing and is measured by the pneumatic weighing unit or other suitable transducer. Alternatively, the load current, torque or speed change of each driving motor can be measured as an indication of the braking effort being applied to its associated wheel. In the case of hydraulic or pneumatic motors, the pressure will increase with load and provide an indication of torque output.

The measured values of brake effort are monitored during the test period and an output signal, i.e., in the form of an indicating lamp, is produced when the values of brake effort fall within or outside of a predetermined range of acceptable values. The strongest or weakest brake is also identified to facilitate repair work. Standard values of brake effort for different weight classes of vehicles may be stored in a suitable memory and the set of values associated with a vehicle of a given weight class may be chosen by the operator in order to allow interchangeable testing of vehicles of different weights. The output signals may take the form of a lighted display, pumched cards or tape, or a printed sheet itemizing the necessary brake repairs.

An evaluation of the test results obtained is made against a set of realistic standard values previously determined through a careful program of testing the behavior of vehicles equipped with brakes having malfunctions, repairing the malfunctions and again testing the behavior of the vehicles with corrected brake systems. The standard values selected enable the behavior of the brakes of each vehicle tested to be classified as satisfactory, marginal, or unsafe. Evaluation of the test results is relatively simple and will identify nearly all conceivable brake malfunctions. In most cases, an exact cause of the malfunction can be identified by a specific symptom of the brake analyzer operation, and in all cases the cause or causes of the malfunction can be categorized as either mechanical, hydraulic, or frictional, or a combination of two or more of these factors.

In accordance with the present invention, an apparatus is provided for analyzing the braking performance of a wheeled vehicle. The vehicle has wheel brakes associated with at least two of the wheels and a brake actuator for simultaneously applying the brakes of said wheels. The apparatus includes test means such as a dynamometer for rotating the wheels of the vehicle for a test period during which the brakes are applied. Brake effort signal generating means are included as a part of the test means for producing a separate brake effort signal for each wheel while the wheel brakes are being applied. Means are provided to respond to tbe brake effort signals and to the operation of the brake actuator for producing a brake system response signal proportional to the time delay between the operation of the brake actuator and (1) the engagement of the first brake to engage or (2) the attainment of a preset brake effort level. The apparatus may further include means responsive to the brake system response signal for producing a satisfactory or fail brake system response signal when the brake system response signal is less than or exceeds a preset maximum acceptable value. In the alternative, the brake effort level reached by the wheel brakes after a preset time delay from the operation of the brake actuator may be measured and compared with a preset acceptable value.

BRIEF DESCRIPTION OF THE DRAWINGS

The construction and operation of the invention, as well as additional objects and advantages thereof, will become apparent when the following description is read in conjunction with the accompanying drawings, in which:

FIG. 6 is a block diagram of a programmer for use in the computer of FIG. 3;

FIG. 7 is a block diagram of certain computer components for providing rolling resistance test data;

FIG. 8 is a block diagram of certain computer components for calculating and storing the pre-hydraulic brake effort level;

DETAILED DESCRIPTION OF THE PREFERRED EMBODIMENT

Figure 1:
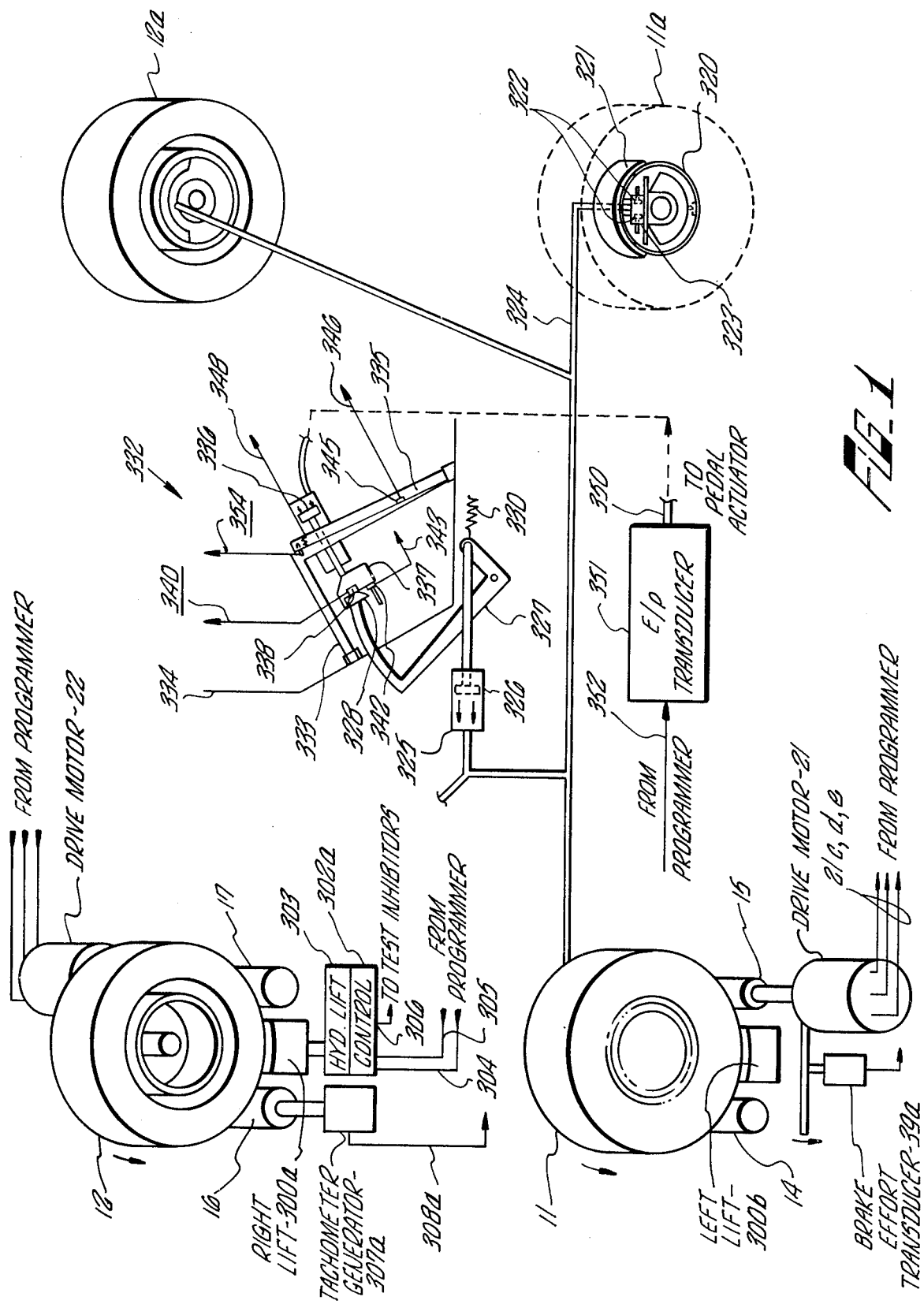
FIG. 1 is a diagrammatic view of a brake testing apparatus in accordance with the present invention.
Figure 2:
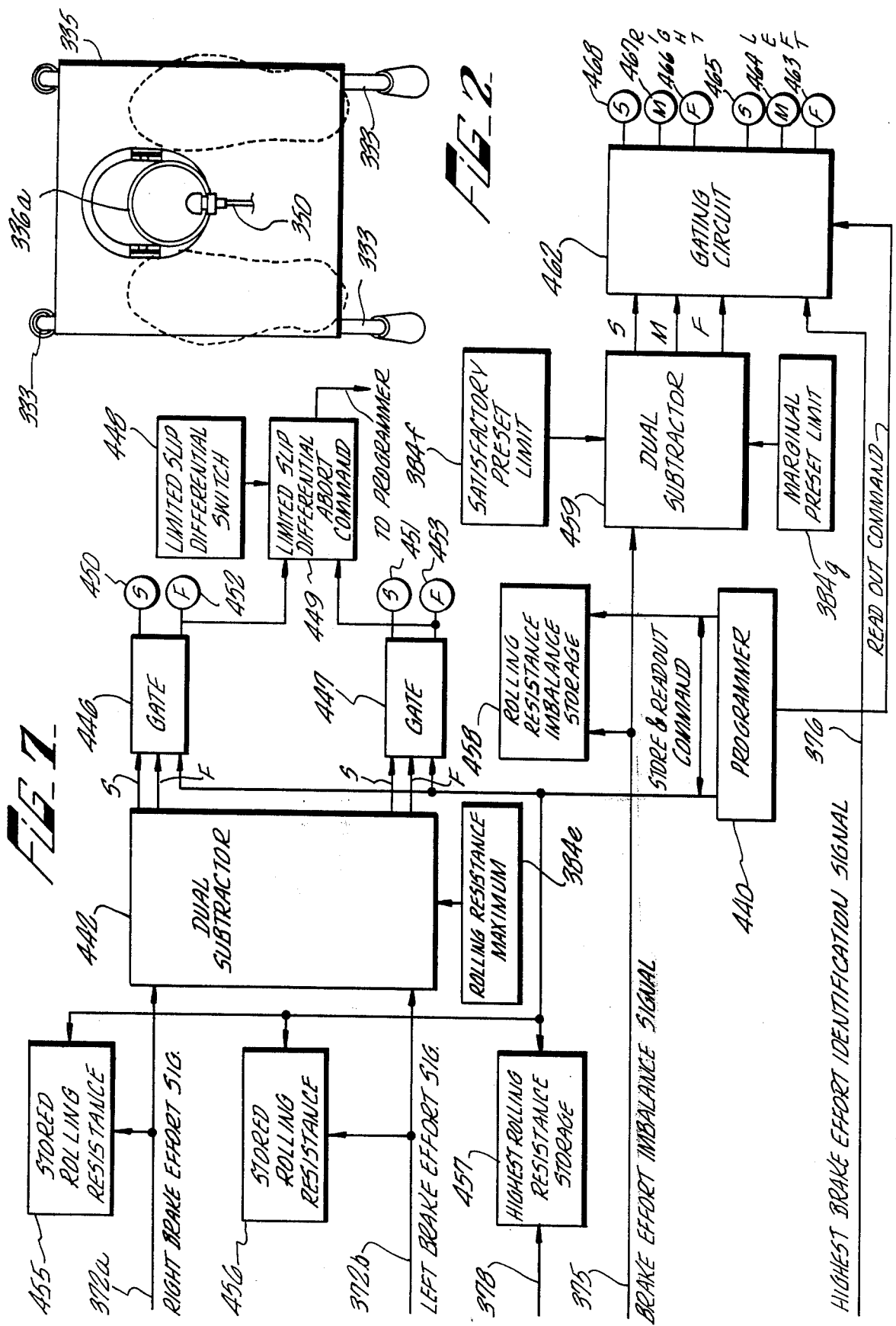
FIG. 2 is a plan view of the brake pedal control unit 332 of FIG. 1 illustrating the placement of the operator's feet thereon in dotted lines.
Figure 3:
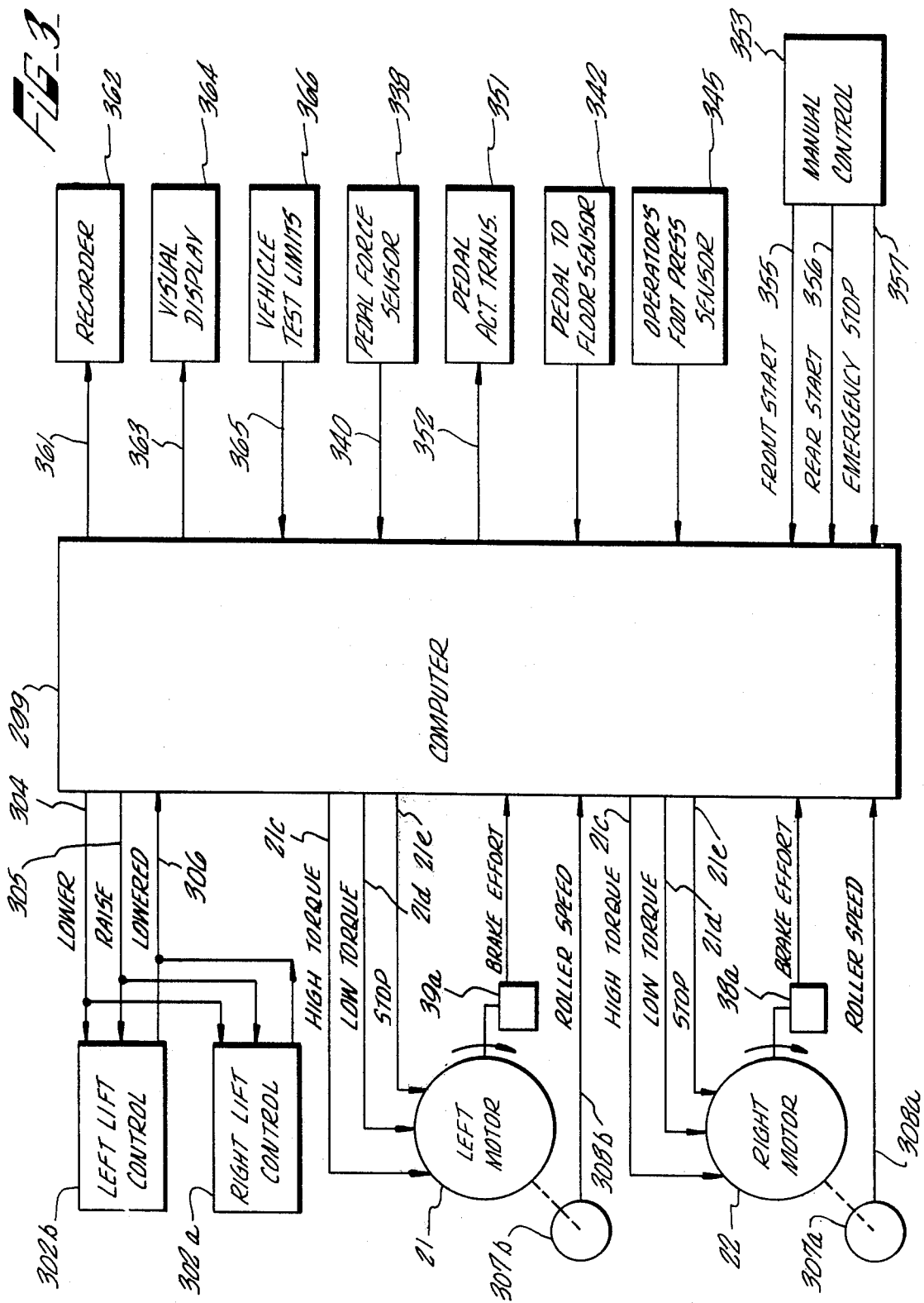
FIG. 3 is a block diagram of a computer, control and sensor units for use with the apparatus of FIG. 1.

A computer controlled or automatic brake analyzer system for testing vehicle brakes is described in FIGS. 1, 2 and 3. Referring now to FIG. 1, a four-wheeled vehicle is illustrated with the front wheels 11 and 12 cradled between the rollers 14 through 17 of a motoring dynamometer. The rolls 15 and 17 drive the wheels during the test, as will appear later. The rolls 14, 15, 16 and 17 are rotatably supported by bearings mounted in a conventional frame assembly, not shown. The rolls and frame assembly may be arranged in any convenient manner to permit the wheels of the test vehicle to be easily stationed thereon. In an exemplary installation the frame assembly may be mounted in a pit with the rolls at the floor level so that the test vehicle may be readily driven on and off the rolls. The rolls 15 and 17 are oriented so that they are farthest from the front end of the vehicle during a test.

Cradle-mounted electric motor 21 and 22 are provided as driving means for the left and right rolls 15 and 17, respectively. The shafts of the motors are directly coupled to the shafts of the respective drive rolls 15 and 17 by suitable flexible couplings (not shown). The front rolls 14 and 16 are permitted to idle.

A careful balance of motor power and roll spacing is necessary in the described apparatus in order to permit accurate simulation of on-highway speeds and braking conditions. Thus, it has been found that the brake heat produced in stopping a vehicle traveling 60 MPH is about nine times higher than that produced in stopping from 20 MPH. A high integrity testing system must have sufficient power to produce such heat at the brake friction surfaces in the time consumed in a normal highway stop. Thus, neglecting vehicle wind resistance as a retarding force, a 0.5 G deceleration of a 4000 lb. vehicle from 60 MPH to 0 MPH results in an average brake heating rate of 113 btu/sec over a stopping time of 5.48 sec. This power requirement can be met by application of 40 horsepower at each wheel to be tested.

Although on-highway brake friction surface rubbing velocities decrease as the vehicle decelerates, it has been found that test integrity is affected only at extremely high speeds resulting in low brake application forces for a given heating rate and at speeds below the critical rubbing velocity of the friction surfaces. Thus, integrity may be retained when tests are performed at one speed so long as the speed selected falls within the wide limits set forth above.

Selection of a particular speed is also dependent upon the tractive effort between the driving rolls 15 and 17 and the tire tread. When a vehicle tire is cradled between two rolls as shown in FIG. 1, pressures less than road contact pressures are present between the tires and each roll. The pressure normal to the roll surface is dependent upon both the roll spacing and the particular roll from which the turning force is applied to the tire. Thus, it should be apparent that as the brakes are applied against rotating drive rolls 15 and 17, the vehicle will tend to move backward. This will reduce the tire contact pressure against the forward idle rolls 14 and 16 and increase the tire contact pressure against the rear drive rolls 15 and 17. Accordingly, application of power to the tires through the rear drive rolls 15 and 17, as shown in the preferred embodiment, has the advantage of increasing the tire-to-roll contact pressure as the brakes are increasingly applied.

The motors 21 and 22 are controlled from a motor by computer 299 through lines 21c, d and e to provide a high torque, low torque and to stop. A pair of pneumatic lifts 300a and 300b are positioned between the rolls as illustrated to lift the wheels 11 and 12 off the rollers 14 through 17 in their raised position and thereby permit the test vehicle to be readily driven on and off of the rollers. Once the appropriate wheels are positioned between the rollers 14 through 17, the pneumatic lifts are operated by means of appropriate electronic control units such as 302a. The electronic control units operate fluid power lift units (303 in FIG. 1) to lower or raise the lifts in response to appropriate control signals on lines 304 and 305, respectively from the computer 299. The lift control units 302a send back a lift lowered signal via line 306 to the computer 299 indicative of the fact that the lifts are in a lowered position so that a selected testing sequence can begin.

Each motor 21, 22 is cradled as in a dynamometer so that a force reaction can be measured from its housing, which is equal to the input force to the rolls and tires. Consequently, as the brakes are applied, their torque resistance to wheel rotation is proportional to motor housing reaction. Since the right and left rolls are not interconnected, the retarding force from each brake can be independently measured by any suitable electrical transducers which provide an output signal proportional to the torque between the respective housing of motors 21 and 22 and the fixed rame. For example, brake effort signal generating transducers 38a and 39a are connected to the motors 22 and 21 to provide output signals representative of the torque applied by the drive motors which, in turn, is representative of the retarding force between the respective wheels and the drive rollers 15 and 17. Only one brake effort transducer 39a is shown in FIG. 1 for purposes of illustration. For a more detailed discussion of transducers suitable for measuring the brake effort exerted on a motoring dynamometer, see British Pat. No. 1,284,498 which issued on Dec. 6, 1972.

A pair of tachometer generators 307a and 307b are coupled to the driven rollers 16 and 14 for providing d.c. signals to the computer via lines 308a and 308b having an amplitude proportional to the speed of the respective driven roller. Only generator 307a is illustrated in FIG. 1.

The test vehicle illustrated in FIG. 1 is provided with conventional brake drums and shoes with the brake shoes 320 being forced outwardly against the drums 321 by a manually controlled force responsive brake actuator including a pair of conventional pistons 322 carried within a wheel cylinder 323. Brake fluid is forced through brake lines 324 to operate the wheel cylinder pistons 322 and apply the brakes by means of a conventional master brake cylinder 325 including a piston 326 operated by brake lever 327 in response to a force applied to a brake pedal 328. The brake lever 327 is biased by a spring 330 in a position to maintain the brake pedal in its uppermost position to relieve the pressure in the brake lines and permit the brake shoes 320 to be withdrawn from the brake drum by conventional springs, not shown.

A brake pedal actuator control unit 332 for applying a programmed force to the brake pedal 328 is described more particularly in the copending application Ser. No. 382,538 filed July 25, 1973, and assigned to the assignee of this application. The unit 332 includes a frame 333 which comprises a pair of L-shaped legs which rest on the floor 334 of the vehicle under test. A foot treadle 335 is pivotally mounted at the lower end of the frame 333. A piston 336 is mounted within a fluid power cylinder and forces a brake pedal bracket 337 against the brake pedal 328 in accordance with the pressure of the fluid on the piston 336. A pedal force sensor (transducer) 333 is disposed between the bracket 337 and the brake pedal 328 to provide an analog signal on line 340 which is proportional to the force applied to the brake pedal. A pedal-to-floor distance sensing unit 342 provides an output signal on line 343 when the pedal position has become less than the minimum acceptable pedal-to-floor distance.

The foot treadle 335 is biased outwardly away from the frame 333 by suitable springs (not shown) with a force in excess of the maximum force required during the testing sequence. A foot pressure sensor in the form of a micro-switch 345 is actuated when the force exerted by the operator's feet on the treadle 335 exceeds the maximum anticipated pedal force, causing the treadle to move downwardly a predetermined distance against the spring bias. The foot pressure sensor 345 when actuated produces a foot pressure sensor signal on line 346 indicating that the operator is placing sufficient force against the treadle 335 to prevent movement of the brake pedal actuator control unit while the brake pedal is operated at maximum force by the piston 336. Fluid under pressure is applied to the piston 336 for operating the brake pedal via pneumatic line 350 and pedal actuator transducer 351. A pedal position transducer (not shown) is suitably secured to the fluid cylinder for generating a signal on line 348 which is proportional to the position of the piston 336, for providing information concerning the brake pedal travel during the testing sequence as will be discussed in more detail.

The brake pedal control unit 332 is manually placed within the test vehicle at the beginning of the testing sequence. The operator guides the brake pedal bracket 337 until it engages the brake pedal 328 as shown in FIG. 1. An additional micro-switch may be positioned on the bracket 337 to be actuated when the bracket engages the brake pedal thereby providing a signal indicating that the control unit is in place. Rather than remove the brake actuator control unit 332 from the vehicle during the time that the vehicle is moved to change the pair of wheels that are positioned on the dynamometer rollers 14 through 17, the control unit 332 may be left in the vehicle and the brakes controlled by the computer. To provide this type of control, a treadle sensor signal proportional to the force applied by the operator to the treadle may be produced by a suitable transducer and fed back to the computer via line 354. The compouter responds to the treadle sensor signal on line 354 to actuate the pedal actuator transducer 351 and apply fluid pressure to the piston 336 which is proportional to the pressure of the operator's feet on the treadle. Such a transducer is described more particularly in copending application Ser. No. 382,538. The operator is thus provided with reliable control of the braking action of the vehicle while it is being driven to place the rear wheels 11a and 12a on the dynamometer rollers.

Referring now to FIG. 3, the computer or automatic control system 299 is actuated by a manual control unit 353 to selectively commence the test sequence for the front or the rear wheels and to stop, via signals on lines 355, 356 and 357, respectively. The computer 299 receives input signals from the lift controls 302a and b indicating that the lifts are in the lowered position and the test vehicle wheels are properly positioned for the test sequence. The computer also receives input signals from the brake effort transducers 38a and 39a, tachometer generators 307a and 307b, foot pressure sensor 345, pedal-to-floor distance sensor 342, and pedal force sensor 338. The computer 299 controls the induction motors 21 and 22 to provide high or low torque ($y$ or $\Delta$ connection) or to stop, via signals on 21c, d and 3, respectively. The pedal actuator transducer 351 is controlled via signals on line 352 to apply sufficient force to the vehicle's brake pedal to provide a predetermined brake effort from the strongest brake or a predetermined pedal force as will be discussed in more detail.

The computer may provide output signals on line 361 for recording by a conventional recorder 362, for example, of the strip chart type or magnetic type. The recorder 362 may also be in the form of a printer which provides a printed sheet indicating the condition of the vehicle brakes, with or without recommendations as to suggest corrective work needed, if any. The computer may also apply output signals on line 363 to a visual display arrangement 364 such as a group of lights to provide a recorded indication of appropriate output signals indicating that certain braking characteristics are satisfactory, marginal or unacceptable. The visual display arrangement provides a recordation of such output signals for a time duration in excess of the testing period so that the operator may review the braking performance after the testing sequence has been performed on front, rear or both sets of wheels of the test vehicle.

Figure 5:
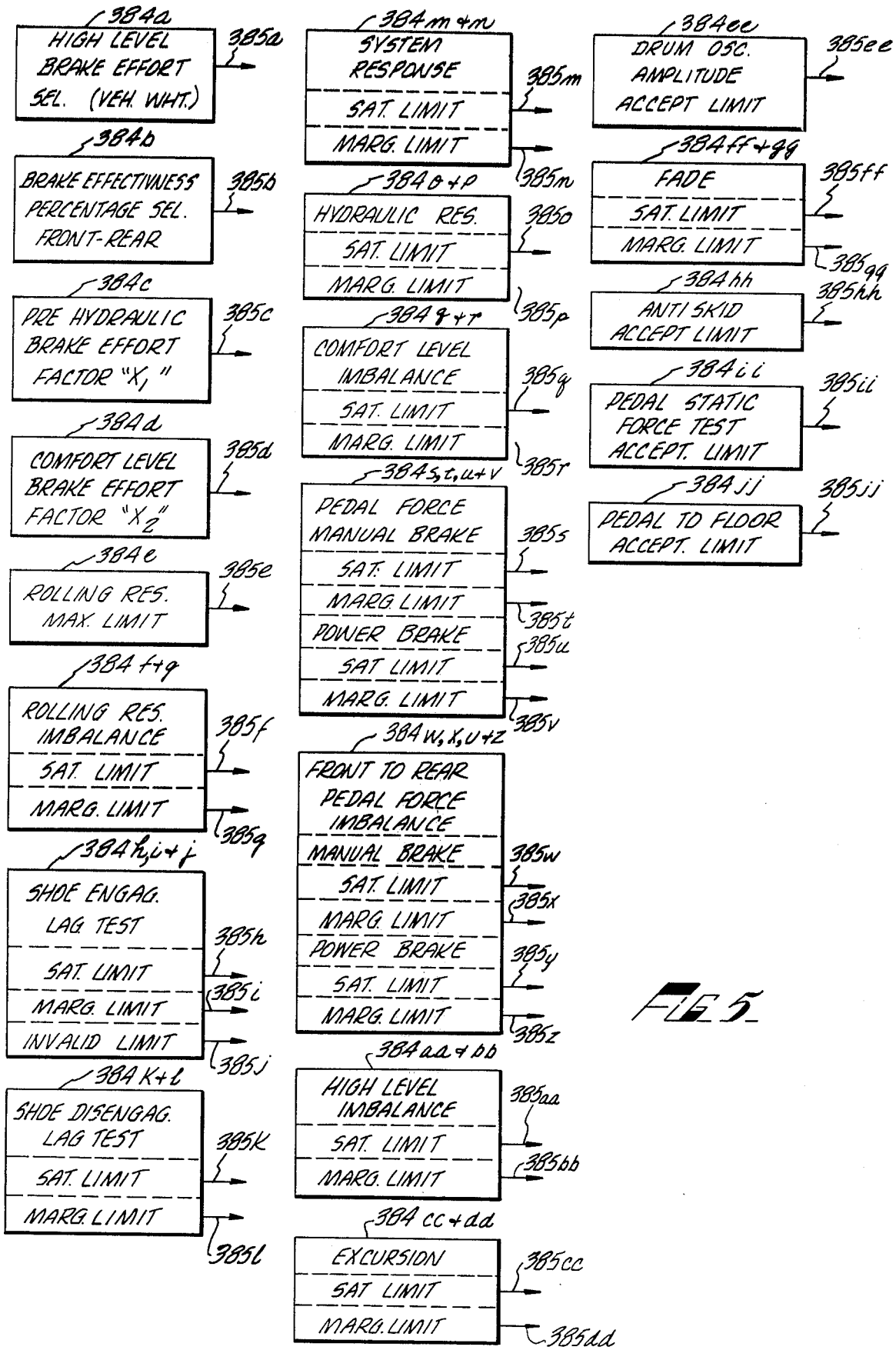
FIG. 5 is a block diagram of certain vehicle test limit storage elements for use in the circuit of FIG. 3.

To determine whether or not the braking performance of the vehicle under test is satisfactory, marginal or unacceptable, pre-established test limits are fed into the computer on line 365 from a vehicle test limits storage arrangement 366, shown in more detail in FIG. 5.

Figure 4:
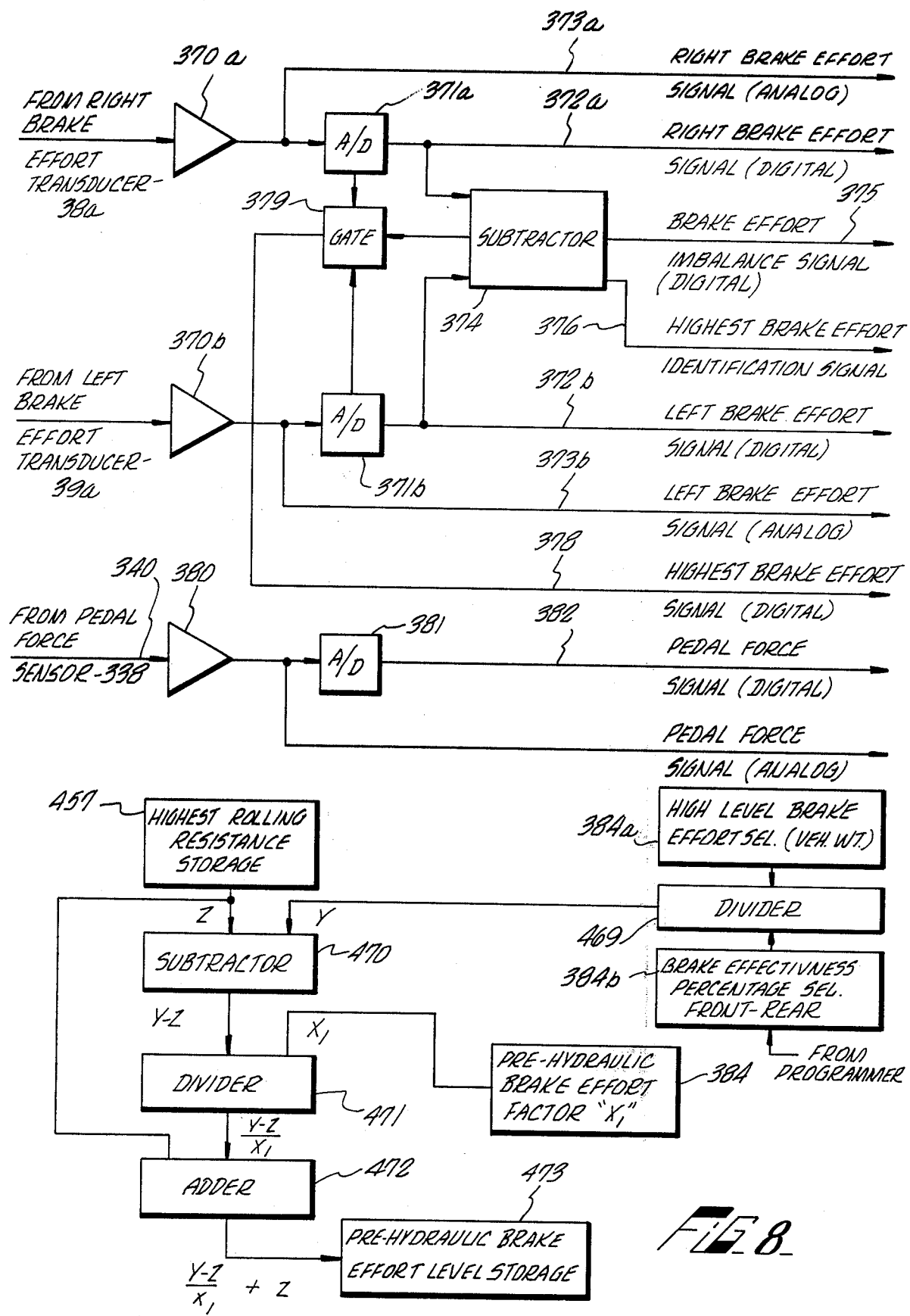
FIG. 4 is a block diagram of analog to digital converters for converting the analog brake effort and pedal force signals to digital format.

The computer 299 operates on digital signals and thus includes conventional analog-to-digital converters for converting analog input signals into corresponding digital Analog-to-digital converters for providing digital right and left brake effort signals and pedal force signals are illustrated in FIG. 4. Analog signals from the right and left brake effort transducers 38a and 39a are amplified by amplifiers 370a and 370b and converted to binary signals by analog-to-digital converters 371a and 371b. The binary signals representing the right and left brake efforts are supplied on lines 372a and 372b to logic and storage elements within the computer as will be described in more detail. The lines such as 372a and 372b for carrying digital information in the form of multi-bit words between the various computer components illustrated in the drawings are composite lines, that is, one line is used for each bit or N lines for an Nth bit word to transfer the data in parallel form. Thus, each digital data transmission line as shown in the drawings represents a composite of Nth lines.

A subtractor 374 subtracts the digital signals representing the right and left brake efforts to produce a braking effort imbalance signal on line 375. Analog signals representing the separate brake effort signals are also supplied to certain computing components via lines 373a and 373b. The right and left brake effort signals on lines 372a, 372b, 373a and 373b represent the gross braking effort or the total retarding force between the left or right wheel 11 or 12 and the respective drive roller 15 or 17. During the time that the brakes are not being applied to the vehicle, the signals on lines 372a, 372b, 373a and 373b represent rolling resistance of the respective wheels and when the brakes are being applied, these signals represent the sum of the rolling resistance and the braking effort contributed by the brake drum and shoe of the respective wheel.

The brake effort imbalance signal on line 375 represents the gross imbalance in the retarding force between the wheels 11 and 12 and the respective drive rollers and thus includes the rolling resistance imbalance of the two wheels. The subtractor 374 also applies an output signal on line 376 having a logic sign (high or low) dependent upon which brake effort signal is the largest. The logic sign of the signal on line 376 thus identifies the strongest (and weakest) brake. For example, a true logic signal (high level) on line 376 may be utilized to indicate that the highest brake effort is supplied by the right brake and a false logic (low level) signal may be used to indicate that the left brake is strongest.

A gate 379 receives the highest brake effort identification signal (true or false) and switches the highest brake effort signal (right or left) to an output line 378. The analog signal from the pedal force sensor 338 is also amplified by amplifier 380 and converted via an analog-to-digital converter 381 to a binary signal representative of the force applied to the brake pedal 328 (FIG. 1) by the pedal actuator 332 (FIG. 1).

Referring now to FIG. 5, there are illustrated vehicle test limits storage elements 384a through 384jj for supplying digital signals representing satisfactory, marginal and unacceptable limits of brake performance of the vehicle under test and the brake effort levels at which the tests are to be conducted. The storage elements of FIG. 5 provide a total of 36 output signals on lines 385a through 385jj to the computer. The circuit associated with each of the output lines 385a through 385jj may be of the type shown in FIG. 6 of copending application Ser. No. 382,538. The output signal for any line 385a through 385jj may represent 2$^{10}$ or a total of 1024 discrete values.

The storage element 384a of FIG. 5 determines the total brake effort required (front plus rear wheel brakes) for the high level brake effort tests for the particular vehicle. The high level brake effort signal on line 385a may be selected from as many as 1024 discrete values but as a practical matter may be limited to five values representing categories of weight of the vehicles being tested. Such categories may, for example, represent (1) small cars, (2) intermediate compacts, compact cars, (3) heavy compact cars, (4) standard cars, and (5) heavy cars. The storage element 384b provides an output signal on line 385b which represents the brake effectiveness percentage between the front and rear wheels of the vehicle under test. For example, the storage element 384b may be set to provide a brake effectiveness of 75% for the front wheels and 25% for the rear wheels, or 60% for the front wheels and 40% for the rear wheels, etc. A 1 percent variation may be utilized if desired. The storage element 384c provides an output signal representing the pre-hydraulic brake effort factor $X_1$ which is utilized by the computer to arrive at the degree of braking effort utilized to derive certain test data from the vehicle in pre-hydraulic tests as is described in more detail in copending application Ser. No. 382,538. The storage element 384d provides an output signal which represents a comfort level brake effort factor $X_2$ which is utilized by the computer to derive the comfort level brake effort at which brake effort imbalance of the vehicle is measured as is described in copending application Ser. No. 382,538. The storage element 364m and 384n provides output signals on lines 385m and 385n which represent the satisfactory and marginal limits of brake system response time delays. The remaining storage elements provide signals representing satisfactory, marginal or acceptable limits for other brake tests for the particular vehicle under test and the value of such signals may be varied in accordance with braking performance requirements dictated by governmental agencies, etc.

It should be noted that only two output signals are utilized from each of the storage elements 384stuv and 384wxyz at any one time, and the two particular output signal lines that are read by the computer will be determined by the type of brake incorporated into the test vehicles, that is, manual or power brakes.

The vehicle test limit information stored in elements 384a through 384jj may, of course, be supplied to the computer by other well known recording means such as punched cards, magnetic tape, etc.

A computer programmer is illustrated in FIG. 6 for providing the commands for a complete testing sequence for the front and rear wheels of the test vehicle. The manual control 353 initiates the testing sequence for the front wheels by an appropriate signal on line 394 and initiates the testing sequence of the rear wheels by a signal on line 395. The manual control unit stops the test program and the dynamometer motors by a signal on line 396. A signal on line 394 or 395 actuates a pre-program storage register 400 to provide a signal on line 304 to cause the lift control units to lower the lifts and cradle the front wheels between the rollers 14 through 17. The storage register 400 also provides a signal on line 352 to the pedal actuator transducer 351 to cause the brake pedal actuator 332 to lower the brake pedal bracket 337 until contact is just made with the brake pedal 328. The brakes are not applied by the signal on line 352 from the register 400.

As shown in FIG. 6, signals on lines 394 and 395 from the manual control 353 are also applied to front and rear wheel test inhibitors 402a and 402b. The wheel test inhibitors also receive signals from the foot pressure sensor 345 via line 346 and from the lift control units via line 306. An appropriate signal (true or false) on all input circuits of either wheel test inhibitor will provide an output signal (i.e. true) on the respective output lines 403 and 404 or 407, 408 and 409.

Front and rear wheel lamp indicators 410 and 412 are responsive to signals on lines 403 and 407 to indicate which set of wheel brakes are undergoing tests. An output signal on line 404 or 409 initiates operation of the motor control 413 which, in turn, applies an appropriate signal on output line 21d to energize the induction dynamometer motors 21 and 22 in a low torque configuration, e.g. Y connection. The dynamometer motors rotate drive rollers 15 and 17 which, in turn, rotate the left and right wheels of the vehicle. The vehicle wheels, in turn, drive the driven rollers 16 and 14 which rotate tachometer generators 307a and 307b. Under certain abnormal conditions some slippage may occur between the tires and the drive rollers 15 and 17 which causes the driven rollers 14, 16 to rotate at a slower speed than the drive rollers 15, 17. The coefficient of friction, influenced, for example, by water between the tires and rollers is an important factor in determining slippage. Thus, the driven rollers 14 and 16 will begin to catch up to the drive rollers 15 and 17 as the surface of the tires dry off.

Each of the tachometer generators 307a and 307b produce a d.c. signal having a magnitude proportional to the rotational speed of the respective driven rollers 16, 14. The signals from the tachometer generators are supplied to one input of a pair of differential amplifiers 416 and 418. The other input of each of the differential amplifiers is connected to a reference voltage source 417. The differential amplifiers 416 and 418 are arranged to provide an appropriate output signal (high level) to a gating circuit 414 only when the output signal from the respective tachometer generator exceeds the reference voltage. An output signal from each differential amplifier is indicative of the fact that both driven rollers are within a predetermined range of the normal induction motor speed representing, for example, a vehicle speed of 45 MPH.

A gating circuit 414 produces an output signal on line 420 in response to output signals from both comparators 416 and 418 and an output signal on line 404 or 409. The output signal on line 420 causes the motor control unit 413 to change the energization to the drive motors to a high torque configuration e.g., Δ connection, via a signal on line 21c. An output signal on line 420 is also supplied to a program command storage 422 to initiate time sequence test commands to the various components of the computer as will be described in more detail. For example, the program command storage provides command signals to a front to rear pedal force balance command control unit 425. The unit 425 in response to the command signal from storage 422 and a signal from the rear wheel test inhibitor via line 408 provides a signal to the pedal actuator transducer 351 to actuate the brakes in the front to rear pedal pressure balance tests to be described.

The program command storage also provides appropriate signals to command unit 427 to initiate a static pedal force and pedal to floor test. At the end of a test sequence, the program command storage supplies a signal to an end of test control unit 430 which sends a signal on line 305 to the lift control units to raise the lifts so that the vehicle may be moved. A manual pedal control unit 432 when enabled by a signal from unit 430 responds to a signal from the treadle pressure sensor on line 354, and provides a signal proportional thereto on line 352 to control the brake pedal actuator 332 in accordance with the operator's foot pressure on the treadle. This permits the vehicle to be moved without removing the actuator 332. The manual pedal control unit 432 is inhibited by a signal on either line 404 or 409 indicating that a test sequence is still under way. Fast and slow rate pedal force control units 434 and 435 apply signals to the pedal actuator transducer 351 to provide a fast or slow rate of brake application as will be described.

The detailed function of the components of the automatic control system 299 for controlling the vehicle brakes and for monitoring the braking effort signals etc., in a multi-step testing sequence is described in detail in my copending application Ser. No. 381,538. Only those components and testing steps which relate to the present invention of apparatus for evaluating brake system response test data is described in detail here.

Preparatory to commencing the test sequence, it is necessary that each of the vehicle test limit storage elements 384a through 384jj be adjusted to provide the appropriate output signal. The category of weight of the vehicle, i.e., compact, etc., percent of balance between front and rear brakes, use of power or manual brakes are reflected by appropriate adjustments in storage elements 384a and 384b, 384stuv and 384wxyz. The acceptable or marginal and fail limits as established by the remaining storage elements will remain the same for many vehicles.

An anti-skid and limited slip differential switch may also be manually set by the operator prior to the commencement of the test sequence. An anti-skid switch (not shown) permits the operator to determine whether the anti-skid test will be performed on the front and/or rear wheel brakes. A limited slip differential switch permits the operator to override an abort command when the maximum rolling resistance of either wheel exceeds a preset maximum limit as is described in more detail in connection with FIG. 7.

To initiate the test sequence, the vehicle is driven into the test area until the front wheels are positioned between the dynamometer rollers 14 through 17 (FIG. 1). The brake pedal actuator control unit 332 is positioned over the brake pedal and the pedal bracket 337 is positioned over the brake pedal and the pedal bracket 337 is guided into engagement with the brake pedal. The manual control 353 is then actuated by the operator while seated behind the vehicle steering wheel to initiate testing of the front wheels.

Referring now to FIG. 6, the hydraulic lifts are lowered by the preprogrammed storage register 400 and the motors are energized in the low torque configuration as discussed previously. When the driven rollers 14 and 16 have reached a predetermined percentage of the test or induction motor speed, i.e. 75%, the gating circuit 414 actuates the motor control 413 to energize the dynamometer motors in the high torque configuration. The gating circuit 414 also provides a signal to the program command storage which, after a predetermined time delay, for example, 2 seconds to enable the dynamometer rollers to arrive at the final test sequence speed, e.g. 45 MPH, issues test commands to the various components to the system to begin the testing operation.

ROLLING RESISTANCE STORAGE AND EVALUATION TEST

The maximum rolling resistance and the rolling resistance imbalance are measured and compared with maximum, satisfactory and marginal preset limits by the computer components illustrated in FIG. 7. The rolling resistance of each wheel is also stored during this testing step for use in later testing steps in providing the net brake effort imbalance. The programmer illustrated in FIG. 7 is shown only in block form and referenced by the number 440. The programmer initiates operation of the various components of FIG. 7, i.e., gates and storage elements and controls the brake pedal actuator via signals to the transducer 351 to maintain the brakes in a released or inoperative condition. The signals on lines 372a and 372b thus represent the rolling resistance of the right and left wheels of the vehicle. The rolling resistance signals are applied to a dual subtractor 442 and stored in storage elements 455 and 456. The subtractor 442 subtracts the right and left rolling resistance signals from a maximum limit rolling resistance signal from storage element 384e. The subtractor 442 applies a first output signal (e.g. high level) on fail lines marked F, to associated gates 446 or 447 when either rolling resistance signal exceeds the maximum limit signal from element 384e. The gates 446 and 447 are enabled by an appropriate readout command signal from the programmer 440 and in response to a fail signal from the dual subtractor 442 to energize a fail lamp indicator 452 or 453, respectively, indicating that the rolling resistance of the respective wheel has exceeded the acceptable limit. The satisfactory indicating lamps 450 and 451 are energized when the subtractors apply a second output signal on S or satisfactory lines to the gates 446 and 447 indicating that the rolling resistance is less than the maximum acceptable limit. The indicating lamps 450 through 453 remain energized by an appropriate latching circuit to be discussed, until after the test sequence has been completed to provide a recorded indication that the vehicle has passed or failed the maximum rolling resistance test. The indicating lamps referred to in the remaining figures also remain energized for a period in excess of the test period to provide a record of the test results.

The automatic control system of the present invention includes a limited slip differential switch 448 and a limited slip differential abort command gate 449 as shown in FIG. 7. A fail signal on line F from the dual subtractor 442 is also applied to the programmer 440 via abort command gate 449 to stop the testing sequence and de-energize the dynamometer motors 21 and 22. The limited slip differential switch 448 when operated to indicate that the vehicle being tested is equipped with limited slip differential inhibits the abort command gate 449 during the rear wheel testing sequence so that a fail signal on line F from the subtractor 442 does not stop the testing sequence.

During the rolling resistance test, the highest rolling resistance signal on line 378 is stored in storage element 457 for later use. The brake imbalance signal on line 375 is also stored in storage element 458 and compared with the satisfactory and marginal preset imbalance limits via a dual subtractor 459. When the brake effort imbalance signal on 375 is greater than the marginal preset limit from storage element 384g, then the subtractor 459 applies an appropriate output signal (e.g. high level) on output line F to gating circuit 462 to cause either a left or right fail indicating lamp 463 or 466 to be energized. When the imbalance signal on line 375 is less than the marginal preset limit but greater than the satisfactory preset limit (384f) then the subtractor 459 applies an appropriate output signal (output line M) to the gating circuit 462 which, in turn, energizes a marginal indicating lamp 464 or 467. The gating circuit 462 is enabled by a readout command signal from the programmer 440 and is also responsive to the highest brake effort identification signal on line 376 to transfer the output signals on the subtractor output lines M or F to left or right indicating lamps. Where the left brake effort signal is the largest, the left indicating lamps (463, 464) will be energized and vice versa. When the imbalance signal on line 375 is less than the preset satisfactory level, then the subtractor 459 applies an output signal on output line S to two satisfactory indicating lamps 465 and 468 via the gating circuit 462.

The indicating lamps 450 through 453 and 463 through 468 inform the operator that (1) the vehicle has passed or failed the maximum rolling resistance test, (2) the vehicle has a satisfactory, marginal or unacceptable rolling resistance imbalance, and (3) the identity of the wheel with the highest rolling resistance where the imbalance is marginal or failing. The output signals from the gates 446 through 447 and 462 may be utilized to operate a printer or other suitable recording device, if desired.

SYSTEM RESPONSE TEST

In preparation for the brake system response test, the computer calculates the pre-hydraulic brake effort level for use in controlling the brake pedal actuator. The components for performing this calculation are illustrated in FIG. 8. The value of the high level brake effort for the front or rear wheel testing sequence is obtained by a divider 469 which divides the total brake effort value stored in element 384a by a number representing the percentage of such value to be used in testing the front or rear wheel brakes, i.e. 75%, 25%, etc.. The highest rolling resistance value Z as stored in element 457 in the previous test is subtracted via subtractor 470 from the output signal Y of the divider 469. The prehydraulic brake effort factor $X_1$ which has been preset into element 384c is divided into the difference signal Y–Z from the subtractor 470 by a divider 471. The quotient $$\frac{Y-Z}{X}$$

is then added to the stored highest rolling resistance signal Z by an adder 472 and the resultant signal is stored in storage element 473.

Figure 9:
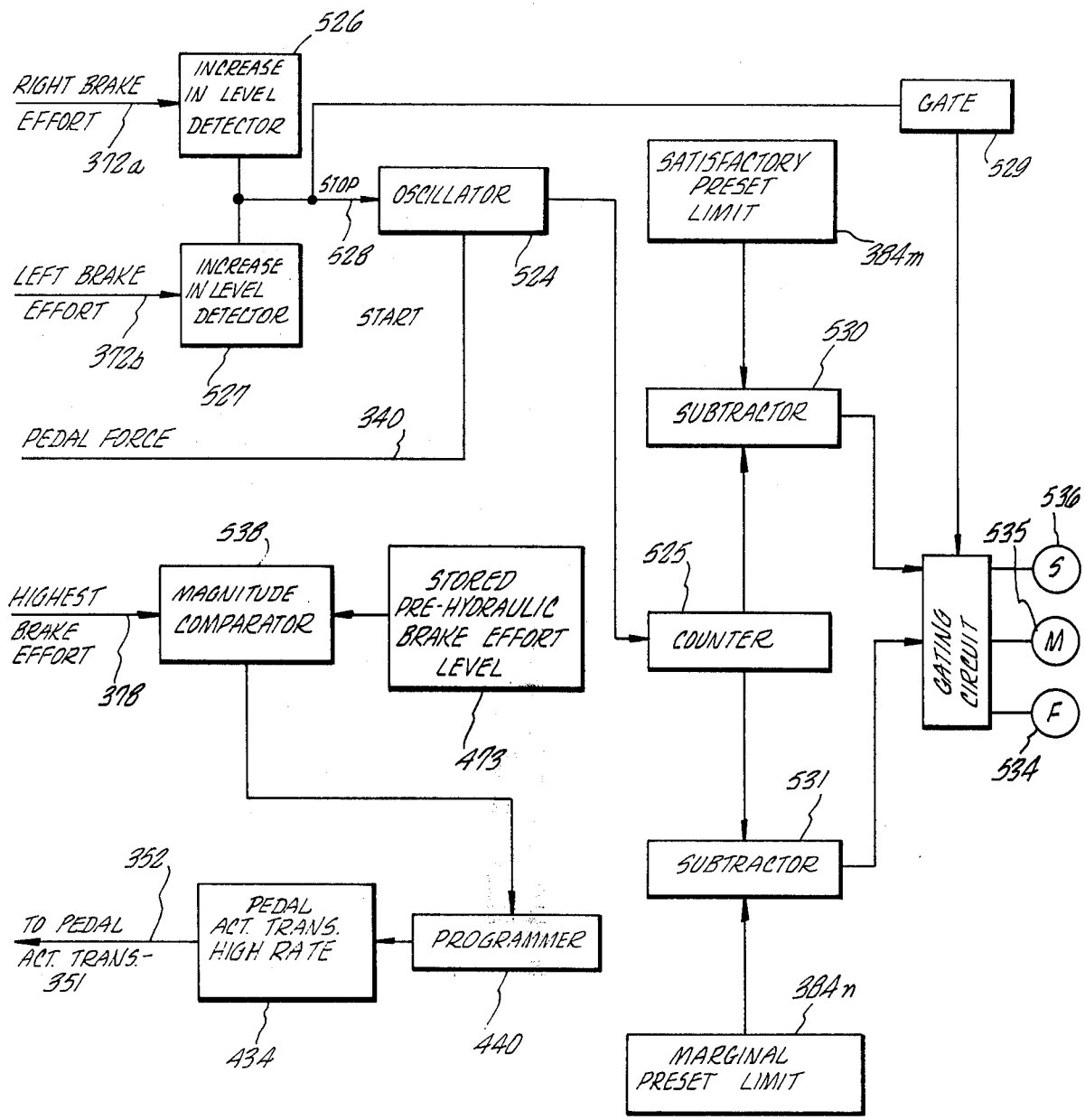
FIG. 9 is a block diagram of certain computer components for providing system response test data.

The system is now ready for the brake system response test. Referring now to FIG. 9, force is applied to the brake pedal at a high rate (e.g. 90 lbs. of brake effort per second) via the high rate controller 434, the brake actuator transducer 351 and the brake pedal actuator control unit 332. The brake pedal actuator continues to apply force to the brake pedal until the highest brake effort signal as measured reaches the pre-hydraulic brake effort level stored in element 473. It should be noted that the brake system response test could be performed by utilizing some value of brake effort in the element 473 other than the pre-hydraulic brake effort level calculated by the circuit of FIG. 8.

Upon the application of force to the brake pedal, the brake pedal force sensor signal of line 340 (FIG. 4) starts an oscillator 524. The output of the oscillator 524 is applied to a counter 525. At this same time, a pair of increase in level detectors 526 and 527 provide a brake engagement signal on line 528 to stop the oscillator 524 when either the right or left brake effort signal has increased a pre-determined amount (i.e. 3 lbs.) indicating that the brake has engaged. The increase in level detectors 526 and 527 may be the same type as the detector 475 shown in FIG. 20 of copending application Ser. No. 382,538.

The count from the counter 525 is compared by the subtractors 530 and 531 to preset satisfactory and marginal limits stored in elements 384m and 384n. The gating circuit 532 is enabled by the brake engagement signal via gate 529 as illustrated. The gating circuit 532 when enabled responds to the output signals from the subtractors 530 and 531 to (1) energize a fail indicating lamp 534 when the count is greater than the marginal preset limit (2) energize a marginal indicating lamp 535 when the count in counter 525 is between the satisfactory and marginal preset limits, and (3) energize a satisfactory indicating lamp 536 when the count is less than the satisfactory preset limit. The lamps 534, 535 and 536 thus inform the operator of whether the brake system response time is satisfactory, marginal or unacceptable. The lamps 534, 535 and 536 remain energized for a time in excess of the time that the brakes are being applied during the test period to permit the operator to read the lamps after the test has been completed.

Figure 10:
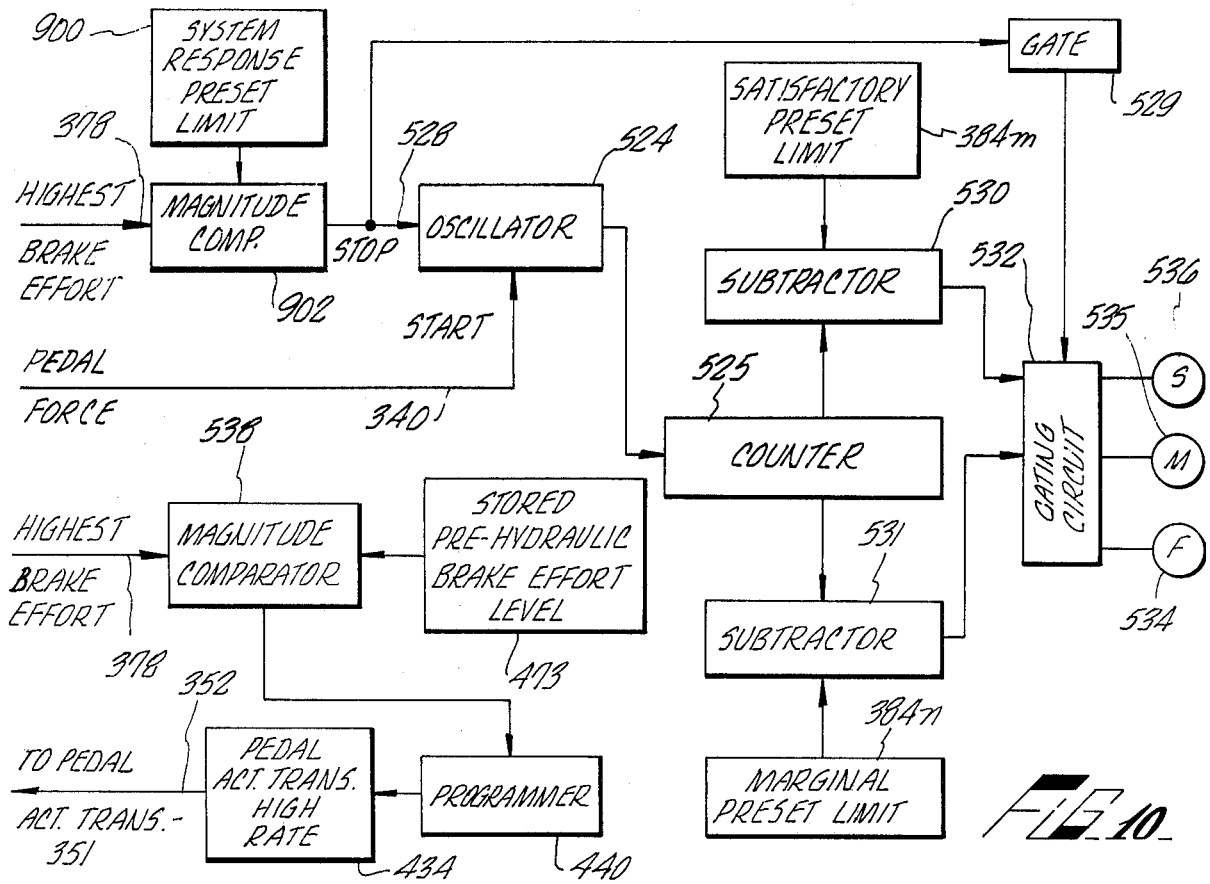
FIG. 10 is a block diagram of another embodiment for providing systems response test data.

An alternative apparatus for performing a brake system response evaluation test is illustrated in FIG. 10. This apparatus also applies force to the brake pedal via an actuator in the same manner as the apparatus of FIG. 9. Upon application of force to the brake pedal, the pedal force signal on line 340 starts the oscillator 524. The output of oscillator 524 is also applied to the counter 525 and compared with the satisfactory and marginal preset limits in the same manner as previously discussed. In the apparatus of FIG. 10 the response time is measured from the time that force is applied to the brake pedal until the highest brake effort reaches a preset limit. To accomplish this objective, the highest brake effort signal on line 378 is compared with a preset brake effort limit as stored in storage element 900 by means of a magnitude comparator 902. When the highest brake effort signal reaches the preset limit (for example, 150 lbs.) as stored in element 900, an output signal from the magnitude comparator 902 stops the oscillator 524 and enables the gating circuit 532 by means of the gate 529. The resulting count in counter 525 is thus equal to the time delay between the application of force to the brake pedal and the attainment of a preset brake effort. It should be noted that the highest brake effort signal on line 378 may be made equal to the highest net brake effort by subtracting the highest gross brake effort from the highest rolling resistance value stored in element 457 of FIG. 7. The count in counter 525 is compared with preset satisfactory and marginal limit values by means of subtractors 530 and 531 as previously discussed.

Figure 11:
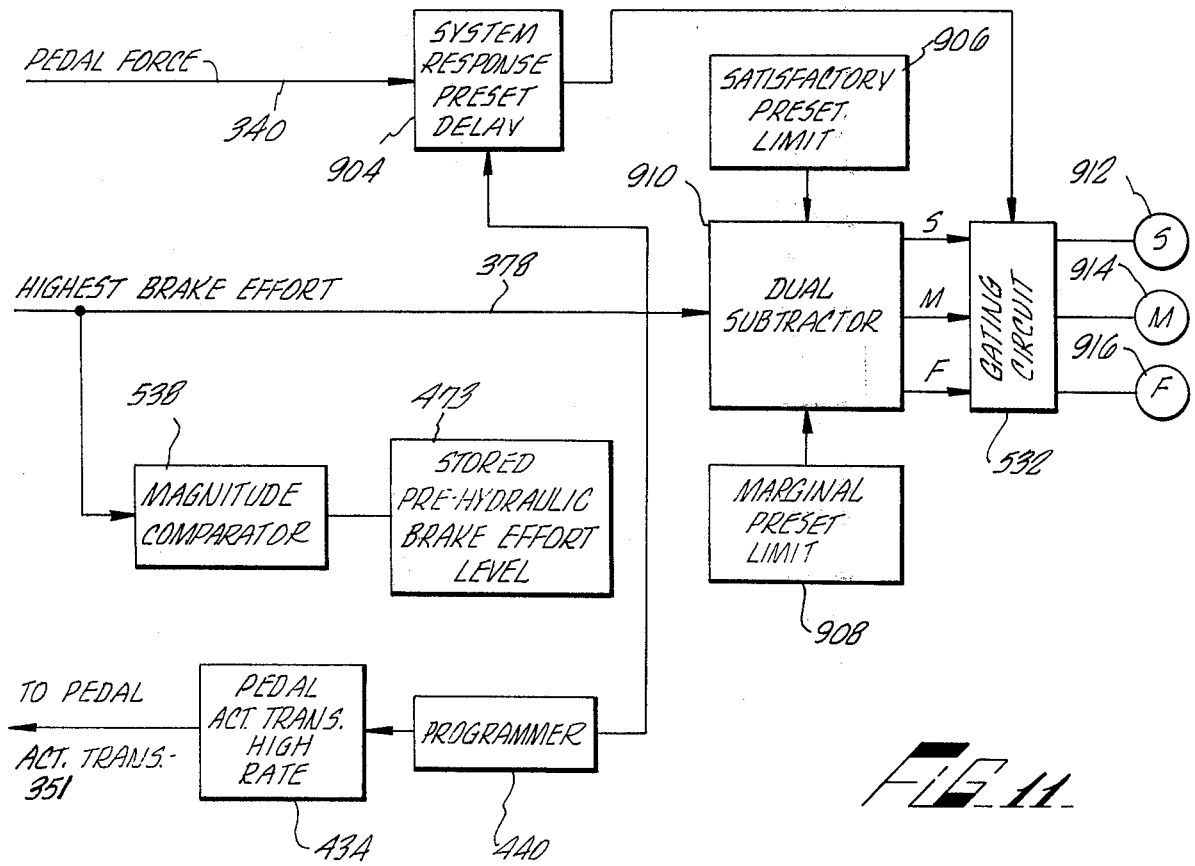
FIG. 11 is a block diagram of another embodiment for providing system response data.

As an alternative, the response of the brake system of a vehicle may be evaluated by measuring the highest brake effort achieved at the end of a predetermined time interval from the time that the brakes are applied. An apparatus for providing this type of data is illustrated in FIG. 11. In accordance with the apparatus of FIG. 11, the pedal force signal on line 340 is applied to a system response delay circuit 904. The delay circuit 904 is enabled by the programmer 440 and produces a readout command signal to the gating circuit 532, a predetermined time interval after receiving the pedal force signal on line 340. During this preset time interval, corresponding to the delay of circuit 904, the highest brake effort signal on line 378 is measured and compared with the values in satisfactory preset limit storage element 906 and marginal preset limit storage element 908 by a dual subtractor 910. The dual subtractor 910 provides output signals on output lines S, M and F indicating that the highest brake effort signal has exceeded the satisfactory preset limit, remains between the satisfactory and marginal preset limits and falls below the marginal preset limits, respectively. The gating circuit 532 upon receipt of the readout command signal from the delay circuit 904 samples the output lines from the dual subtractor 910 and energizes (1) satisfactory indicating lamp 912, (2) marginal indicating lamp 914 or (3) fail indicating lamp 916 when the output lines S, M or F carry the output signal of the dual subtractor 910, respectively.

The brake analyzer apparatus and method of my invention described above measured and compares certain braking performance characteristics such as brake effort imbalance when the strongest brake reaches a predetermined brake effort, e.g., prehydraulic, comfort level and high level. It should be understood that the brake effort level used for such tests may be the sum of the individual brake efforts of the two wheel brakes under test instead of the brake effort reached by the strongest brake. It is only necessary that at least one of the brake effort signals (e.g., one or the sum of both signals) reach a signal representative of a pre-established brake effort to analyze certain of the vehicle braking performance characteristics discussed above.

Logic circuits which may be used in the block diagrams discussed in FIGS. 7, 9, 10 and 11 are illustrated in copending application Ser. No. 382,538.

There has thus been described an automatic brake analyzer for evaluating the brake system response phenomena of a vehicle's brakes. Various modifications to the circuits will be obvious to those skilled in the art without departing from the scope of my invention as defined by the appended claims.

What is claimed is:

1. In an apparatus for analyzing the braking performance of a wheeled vehicle having wheel brakes individually associated with at least two wheels and a brake actuator for simultaneously applying the brakes to said wheels, the combination which comprises:

test means for rotating said wheels of the vehicle;

brake effort signal generating means including the test means for producing a separate brake effort signal for each wheel, the brake effort signals being proportional to the brake effort of the respective wheel while the wheel brakes are being applied; and system response signal generating means responsive to the brake effort signals and to the operation of the brake actuator for producing a brake system response signal proportional to the delay between the time that the brake actuator is operated and at least one of the wheel brakes reaches a preselected brake effort.

2. The combination as defined in claim 1 wherein said one wheel brake is the first brake to engage after operation of the brake actuator and the preselected brake effort is equal to a nominal increase in the brake effort after operation of the brake actuator.

3. The combination as defined in claim 2 wherein the system response signal generating means includes a separate increase in level detector for receiving each of the measured brake effort signals, each increase in level detector being arranged to produce an output signal when the respective brake effort signal increases in value a preset nominal amount.

4. The combination as defined in claim 3 wherein the system response signal generating means includes a brake actuator sensor for providing an output signal in response to operation of the brake actuator to apply the brakes.

5. The combination as defined in claim 4 wherein the system response signal generating means includes a counter for providing the brake system response signal proportional to the time interval between the output signal from the brake actuator sensor and the first output signal from one of said increase in level detectors.

6. The combination as defined in claim 5 including means responsive to the brake system response signal for producing a satisfactory or fail brake system response signal when brake system response signal is less than or exceeds a signal representing a preset maximum acceptable value.

7. The combination as defined in claim 6 including means responsive to the brake system response signal for producing a marginal system response signal when the brake system response signal falls within a preset marginal range of values.

8. The combination as defined in claim 1 wherein said one wheel brake is the brake which produces the highest brake effort and the preselected brake effort is equal to a substantial increase in the brake effort after the operation of the brake actuator.

9. The combination as defined in claim 3 wherein the system response signal generating means includes a brake actuator sensor for providing an output signal in response to operation of the brake actuator to apply the brakes.

10. The combination as defined in claim 9 wherein the system response signal generating means includes a magnitude comparator for producing an output signal when the highest brake effort reaches the preselected brake effort.

11. The combination as defined in claim 10 wherein the system response signal generating means includes a counter for providing the brake system response signal proportional to the time interval between the output signal from the brake actuator sensor and the output signal from the comparator.

12. The combination as defined in claim 11 including means responsive to the brake system response signal for producing a satisfactory or fail brake system response signal when brake system response signal is less than or exceeds a signal representing a preset maximum acceptable value.

13. The combination as defined in claim 12 including means responsive to the brake system response signal for producing a marginal system response signal when the brake system response signal falls within a preset marginal range of values.

14. In an apparatus for analyzing the braking performance of a wheeled vehicle having wheel brakes individually associated with at least two wheels and a brake actuator for simultaneously applying the brakes to said wheels, the combination which comprises test means for rotating said wheels of the vehicle;

brake effort signal generating means including the test means for producing a separate brake effort signal for each wheel, the brake effort signal being proportional to the brake effort of the respective wheel while the wheel brakes are being applied; and means responsive to the brake effort signals and to the operation of the brake actuator for producing a brake system response signal proportional to the time delay between the operation of the brake actuator and the engagement of the first brake to engage.

15. The combination as defined in claim 14 including means responsive to the system response signal for producing a satisfactory or fail brake system response signal when the system response signal is less than or exceeds a signal representing a preset maximum acceptable value.

16. The combination as defined in claim 15 including means responsive to the brake system response signal for producing a marginal system response signal when the system response signal falls within a preset range of values.

17. In an apparatus for analyzing the braking performance of a wheeled vehicle having wheel brakes individually associated with at least two wheels and a brake actuator for simultaneously applying the brakes to said wheels, the combination which comprises:

test means for rotating said wheels of the vehicle;

brake effort signal generating means including the test means for producing a separate brake effort signal for each wheel, the brake effort signal being proportional to the brake effort of the respective wheel while the wheel brakes are being applied; and means responsive to the brake effort signals and to the operation of the brake actuator for producing a brake system response signal proportional to the delay between the time that the brake actuator is operated and the highest brake effort signal reaches a preset system response limit.

18. The combination as defined in claim 17 including means responsive to the system response signal for producing a satisfactory or fail brake system response signal when the system response signal is less than or exceeds a signal representing a preset maximum acceptable value.

19. The combination as defined in claim 18 including means responsive to the brake system response signal for producing a marginal system response signal when the system response signal falls within a preset range of values.

20. In an apparatus for analyzing the braking performance of a wheeled vehicle having wheel brakes individually associated with at least two wheels and a brake actuator for simultaneously applying the brakes to said wheels, the combination which comprises:
  test means for rotating said wheels of the vehicle;
  brake effort signal generating means including the test means for producing a separate brake effort signal for each wheel, the brake effort signal being proportional to the brake effort of the respective wheel while the wheel brakes are being applied; and
  means responsive to the brake effort signals and to the operation of the brake actuator for producing a satisfactory or fail brake system response signal when at least one of the brake effort signals exceeds or remains below a preset minimum value at the end of a predetermined time interval after the operation of the brake actuator.

21. The combination as defined in claim 20 including means for producing a marginal brake system response signal when at least one of the brake effort signals falls within a preset marginal range of values at the end of a predetermined time interval after the operation of the brake actuator.

22. The combination as defined in claim 20 wherein said one brake effort signal is the highest brake effort signal.

23. The combination as defined in claim 22 wherein the last named means includes a brake actuator sensor for providing an output signal when the brake actuator is operated, a system response delay circuit responsive to the output signal from the brake actuator sensor for providing an output signal at a predetermined time interval after the brake actuator output signal and comparator means for comparing the highest brake effort signal with a satisfactory preset limit and output signal generating means coupled to the comparing means for producing unsatisfactory output signal in response to the delay circuit output signal when the highest brake effort signal remains below the satisfactory preset limit.

* * * * *

UNITED STATES PATENT AND TRADEMARK OFFICE
CERTIFICATE OF CORRECTION

PATENT NO. : 3,965,732
DATED : June 29, 1976
INVENTOR(S) : Edwin Lee Cline

It is certified that error appears in the above-identified patent and that said Letters Patent are hereby corrected as shown below:

Column 2, Line 65; delete "tbe" and insert --the--

Column 6, Line 31; delete "compouter" and insert --computer--

Column 10, Line 43; delete "381,538" and insert --382,538--

Signed and Sealed this

Twenty-first Day of December 1976

[SEAL]

Attest:

RUTH C. MASON
Attesting Officer

C. MARSHALL DANN
Commissioner of Patents and Trademarks